Sept. 14, 1943. E. P. BULLARD, 3D., ET AL 2,329,587
ATTACHMENT FOR MACHINE TOOLS
Filed Aug. 3, 1940 2 Sheets-Sheet 1

INVENTORS
Edward P. Bullard III
Frank H. Mussler
BY
Paul M. Geist
ATTORNEY

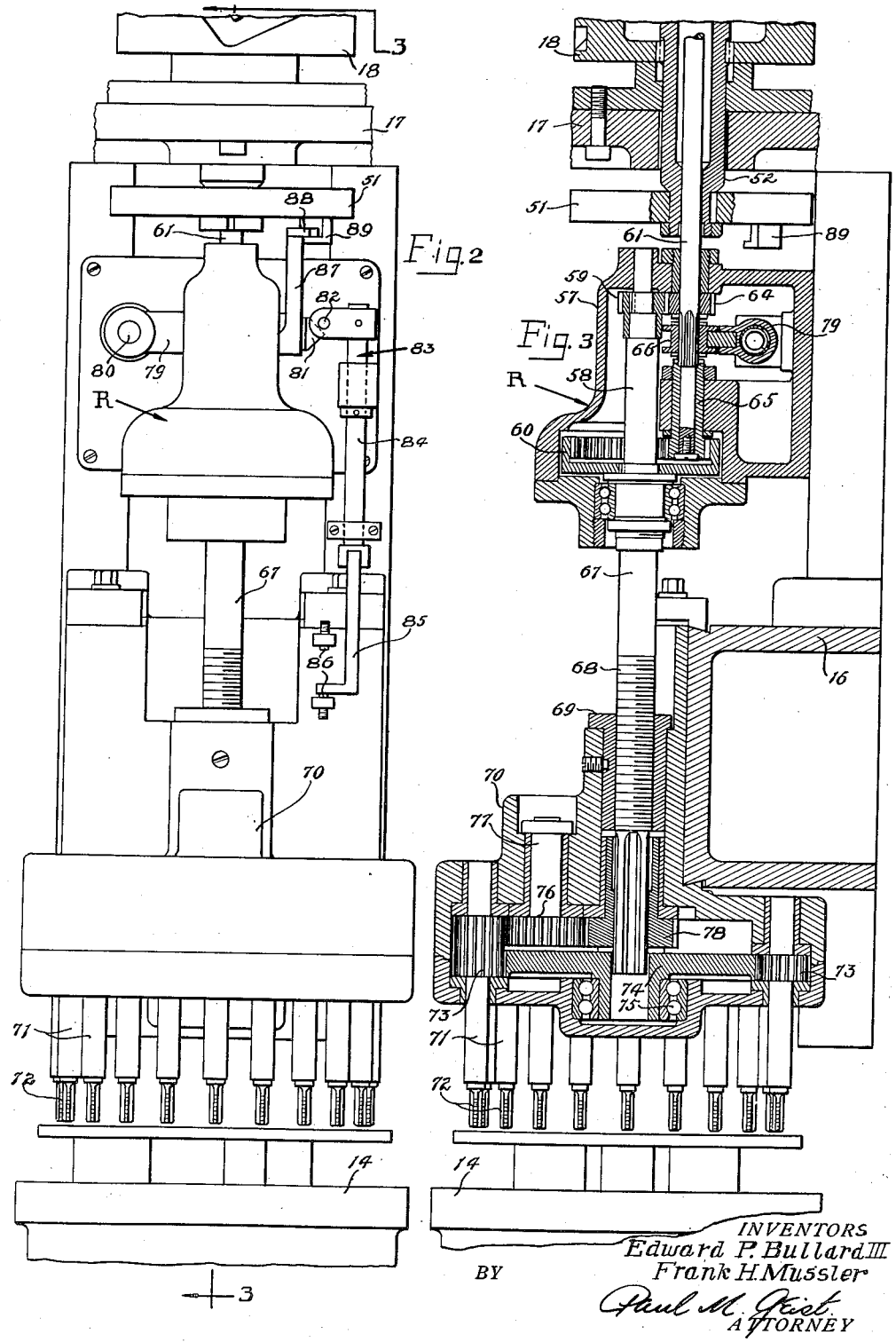

Patented Sept. 14, 1943

2,329,587

UNITED STATES PATENT OFFICE 2,329,587

ATTACHMENT FOR MACHINE TOOLS

Edward P. Bullard, III, Fairfield, and Frank H. Mussler, Stratford, Conn., assignors to The Bullard Company, a corporation of Connecticut Application August 3, 1940, Serial No. 350,575

13 Claims. (Cl. 29—38)

This invention relates to machine tools of the multiple-station indexing type in which the tool-feeding means at each station may have different time cycles of operation from that at all other stations and in which the indexing of the machine is determined by the time cycle of greatest duration, and particularly, it relates to a tapping attachment for this type of machine tool.

An object of this invention is to provide a tapping attachment for the type of machine tool referred to, that will effect a positive lead to the tapping means at all times in both directions of its movement.

Other objects include the provision of a tapping attachment for the type of machine tool referred to, that will effect simultaneous reversing of the directions of axial movement and rotation of the tapping means; the provision of a tapping attachment for the type of machine tool referred to, in which the indexing of the machine will not occur until all of the operations at the various stations, including the tapping operation, have been completed, irrespective of the time required for each individual operation; and the provision of a machine tool of the type referred to and a tapping attachment therefor, in which the tap feeding means and the tool-feeding means at all stations are maintained in timed relation.

The above, as well as other objects and novel features of the invention, will become apparent from the following specification and accompanying drawings, in which:

Figure 2 is an enlarged elevational view looking in the direction of the arrows along line 2—2 of Fig. 1; and Figure 3 is a sectional elevational view taken substantially along line 3—3 of Figure 2.

Figure 1:
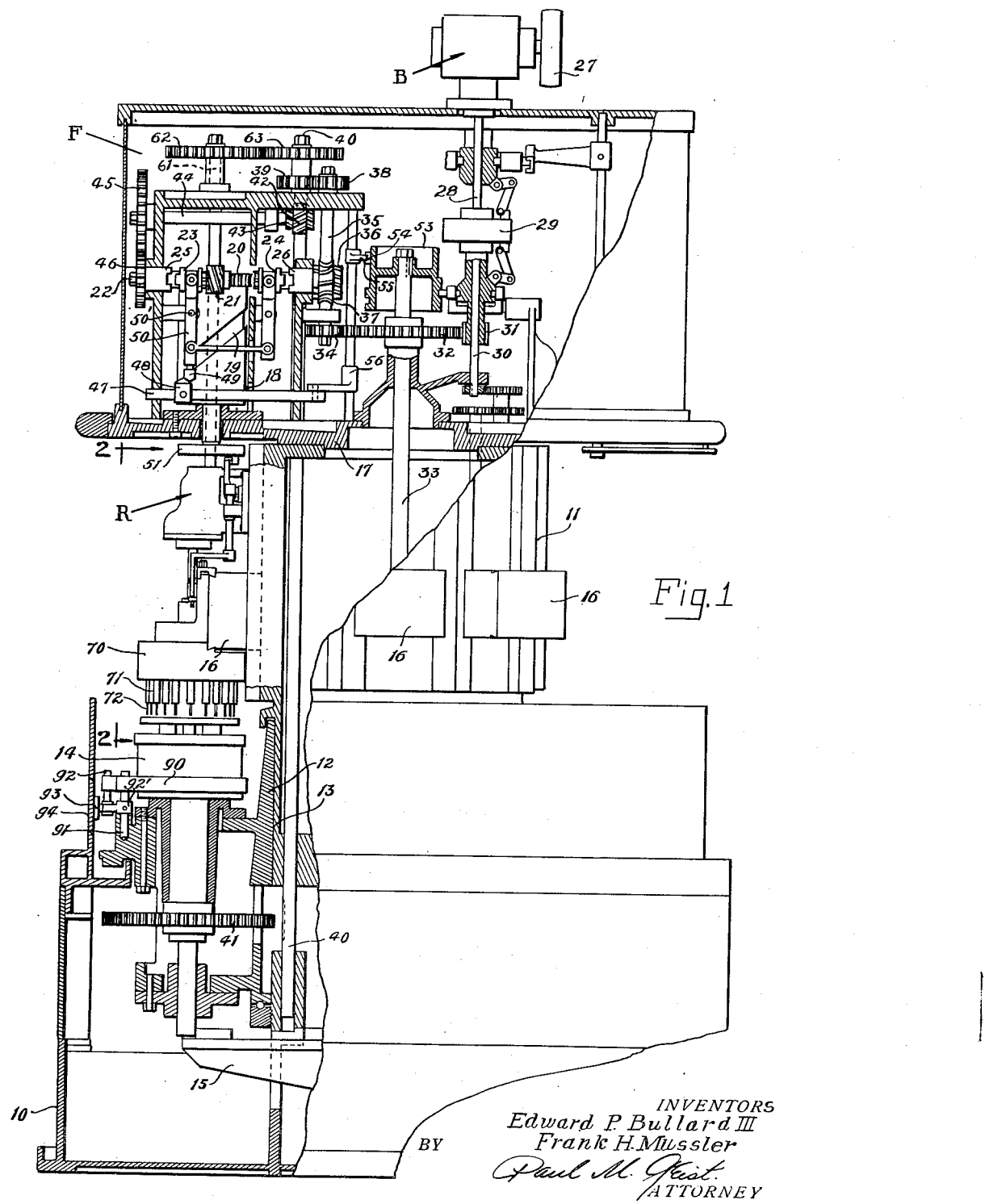
Figure 1 is an elevational view, partly in section, of a multiple-station machine tool to which the principles of the invention have been applied.

The principles of the invention are shown and will be described as applied to the type of machine tool known in the trade as a Mult-Au-Matic lathe, an embodiment of which is shown, described in detail and claimed in Patent 1,360,175 granted to E. P. Bullard on November 23, 1920.

Referring to Fig. 1, the machine tool comprises a base 10 on which a standard 11 of polygonal cross-section is mounted. A substantially annular-shaped carrier 12 is journaled on a cylindrical bearing portion 13 of the standard 11 and supports a plurality of spindles 14 adapted to hold the work to be operated upon. There are as many work-supporting spindles 14 as there are sides to the polygonal standard 11, and they are adapted to be indexed about the standard by indexing mechanism including an arm 15 as described in the above-referred-to patent.

Tool heads 16 are mounted for reciprocation along bearings on each of the sides of the standard 11 except one, at which station the finished work is removed from, and unfinished work mounted on the work-supporting spindles 14. The heads 16 are adapted to support tools for performing various operations on the work at each indexed position the spindles 14 assume about the standard 11. The heads 16 are adapted to be reciprocated along the faces of the standard 11 by individual feedworks F mounted on a platform 17 on top of the standard 11.

Since the feedworks for each head 16 is substantially identical, only one has been shown; and because Patent 1,360,175 specifically describes the feedworks in detail, only a brief description, sufficient to explain its relation to the attachment comprising this invention, will be given.

The feedworks F comprises a cam drum 18 on the periphery of which a cam slot 19 is formed in which a roll (not shown), connected to a rod attached to a head 16, is adapted to seat. The drum 18 is adapted to be rotated in one direction at different rates of speed, namely, at a relatively slow feeding speed and at a relatively rapid traverse speed. A worm gear 20 is formed on the periphery of the drum 18 that meshes with a worm 21 keyed to a shaft 22. Clutches 23, 24 are splined on shaft 22 and are adapted to be simultaneously shifted to connect shaft 22 with power-operated feed clutch 25 or clutch 26, each of which is journaled on shaft 22.

The clutches 25 and 26 are driven from a suitable source, through pulley 27 and gear bracket B located on top of the frame containing the feedworks F. A shaft 28 is driven by pulley 27 and a clutch 29 is adapted to connect shaft 28 with, and to disconnect it from a shaft 30. Shaft 30 supports a gear 31 in mesh with a gear 32 journaled on a central indexing shaft 33 to be described later. Gear 32 meshes with a gear 34 on a shaft 35. A worm 36 on shaft 35 meshes with a worm gear 37 fixed to clutch 26 and journaled on shaft 22. The shaft 35 is also provided with a gear 38 that meshes with a gear 39 on a shaft 40 that extends downwardly to near the bottom of the machine. Shaft 40 is normally provided with a spur gear near its lower end that meshes with a gear 41 that is adapted to drive the spindle 14. However, at the station shown in section (Fig. 1), this gear on shaft 40 is omitted for a purpose to be described later.

Shaft 40 also supports a worm 42 near the top thereof that meshes with a worm gear 43 on a shaft 44. A set of pull gears 45, 46 are removably mounted on shaft 44 and shaft 22, respectively—the latter being keyed to a sleeve of clutch 25. It is evident, therefore, that upon shifting clutches 23, 24 to the left (Fig. 1), the drum 18 will be rotated at a relatively slow rate of speed, while shifting said clutches to the right will cause said cam drum to be rotated at a relatively rapid rate of speed.

Clutches 23, 24 are adapted to be shifted by a slide rod 47 that supports an arrowhead 48 adapted to cooperate with a similar arrowhead 49 on a link 50 of the linkage that effects simultaneous shifting of clutches 23, 24. The rod 47 is adapted to be shifted by manual means as well as by a timing disc 51 all as more fully disclosed and described in Patent 1,360,175. The disc 51 is keyed to a sleeve 52 (Fig. 3) to which drum 18 is also keyed. Adjustable dogs are provided on disc 51 that selectively engage the feed and traverse drives for drum 18 in any predetermined order.

Each of the tool heads 16 is provided with a similar feedworks F that functions substantially the same as the above-described apparatus. As previously stated, the indexing mechanism for the carrier 12 is the same as that of Patent 1,360,175 and is operated by the shaft 33 that is driven from the shaft 30. During operation, as each head arrives at its upper position after the completion of a cycle of operation, locking mechanism is released that normally prevents the rotation of shaft 33.

Upon the release of the locking mechanism associated with the last head 16 to reach its upper limit, shaft 33 makes one revolution effecting the operation of index arm 15 to move the carrier 12 through one indexing movement to position spindles 14 at the next succeeding station of the lathe.

With the feedworks in the position shown in Fig. 1, the rod 47 has been moved to a position causing arrowhead 48 to pivot shaft 50 about pivot 50' tending to move clutch 23 into engagement with feed clutch 25. However, clutch 23 is prevented from doing this and is held in a neutral position by the apparatus shown in Fig. 13 of Patent 1,360,175. Clutch 23 is held in neutral until index shaft 33 rotates to index carrier 12. A drum 53 is fixed to the top of shaft 33 and is provided with a dog 54 for each feedworks F. These dogs are in different horizontal planes so that each cooperates with its own feedworks only. Upon completion of the rotation of shaft 33 dog 54 engages a lever 55 of a linkage 56 that is connected to one end of rod 47. Consequently after an indexing motion of carrier 12 has been completed, rod 47 is shifted to the right so that arrowhead 48 passes to the right of arrowhead 49 thereby causing clutch 24 to be engaged with clutch 26 to cause drum 18 to rotate at traverse speed to begin a cycle of operation of the head 16.

This construction of a cam-operated feedworks is entirely satisfactory for most work. When a tapping operation is to be performed, it is essential that the directions of axial movement and rotation of the tapping means be simultaneously reversed while said means is in engagement with the work. In as much as the reversal of movement of head 16 is normally caused by the roll in cam slot 19 of cam drum 18, and the rotation of a tool associated with the head would be ordinarily effected by positive gearing, it is evident that simultaneous reversal of the directions of movement of head 16 and a rotatable tool cannot be obtained. This invention provides an attachment that is readily mounted in cooperating relation with feedworks of the above described type that will simultaneously reverse the directions of movement of a head 16 and the rotation of tapping means mounted within the attachment.

Referring to Fig. 3, the attachment comprises a reversing mechanism R including a housing 57 adapted to be removably, but fixedly mounted on a face of the polygonal standard 11. A shaft 58 is journaled in housing 57 and is provided with a spur gear 59 and an internal ring gear 60. The gears 59 and 60 are adapted to be rotated in a reverse direction by a shaft 61 that extends upwardly through the cam drum 18 (Fig. 1) and on the upper end of which a gear 62 is keyed. A gear 63 is keyed to shaft 40, and it meshes with gear 62—the two gears 62, 63 are pull-off gears thereby facilitating changing the speed at which shaft 61 is rotated.

A spur gear 64 is journaled on shaft 61 (Fig. 3) in mesh with gear 59, and a sleeve gear 65 is journaled on said shaft in mesh with ring gear 60. A slidable clutch 66 is splined on shaft 61 between gears 64 and 65 and is adapted to connect either of said gears to shaft 61 to effect rotation of shaft 58 in either direction. It is noted that gear 64 will drive shaft 58 at a rapid speed in one direction, while gear 65 will drive said shaft at a slow rate of speed in the opposite direction.

A shaft 67 is journaled in the lower end of housing 57 and is adapted to be coupled to shaft 58 in a manner to render it readily replaceable. The shaft 67 is provided with a relatively coarse-pitched thread 68 that cooperates with a threaded nut 69 fixed against rotation in a housing 70 that is mounted on a tool-head 16. Accordingly, rotation of shaft 67 in both directions will cause slide 16 to be reciprocated along standard 11 independently of the cam drum 18. Therefore, when the attachment is employed, the connection between the slot 19 in cam drum 18 and slide 16 is omitted as shown in Fig. 1.

The tapping attachment may be employed for either center tapping or for off-center tapping. The arrangement in the drawings is shown for off-center tapping wherein a plurality of drilled holes located in a circle on the work are to be tapped. Referring to Fig. 3, the housing 70 is adapted to support a plurality of chuck spindles 71 adapted to hold taps 72. The spindles 71 are arranged in a circle in a manner to register with the drilled holes to be tapped. Each spindle 71 is provided with a gear 73 that meshes with a common gear 74 journaled in a bearing 75 within the bottom of housing 70. One of the gears 73 is longer than the others, and it meshes with an idle gear 76 fixed to a stub shaft 77 journaled within housing 70. Gear 76 meshes with a spur gear 78 splined to the lower end of threaded shaft 67. The pitch of taps 72 is, of course, often finer than a practical pitch for thread 68 that moves head 16. In the present instance the pitch of thread 68 is half that of taps 72 and the gears 78, 73, 76 and 74 drive the spindles 71 at twice the speed of rotation of shaft 67. For any given pitch of taps 72, the gearing 78, 73, 76 and 74 may be modified to drive taps 72 at a speed that will be accurate for a given rotation and practical pitch of threaded shaft 67.

Adjustable means is provided for limiting the stroke of the attachment. Referring to Fig. 2, a clutch shifting arm 79, provided with a pivot 80, for clutch 66 includes an arrowhead 81 adapted to cooperate with a pin 82 in a clutch actuating linkage 83. The linkage 83 comprises a reciprocable rod 84 having an abutment lever 85 connected thereto. Adjustably-mounted abutments 86 are located on the movable head 16 in aligned relation with a portion of lever 85.

Accordingly, as head 16 moves upwardly and downwardly to predetermined positions, pin 82 is moved to opposite sides of arrowhead 81 causing it to move with arm 79 to shift clutch 66.

In order to time the successive cycles of operation of the attachment with the cycles of operation of tool heads 16 at all other stations of the machine tool, a link 87 is connected to arm 79 and is provided with a finger 88 that cooperates with a cam 89 on the timing disc 51. The disc 51 is set, by adjusting cams thereon, to be rotated at a combination of traverse and feed rates so that upon the completion of a cycle of operation of the attachment, the cam 89 will be in position to intercept link 87 as arm 79 is forced in a direction tending to shift clutch 66 into engagement with gear 65. Clutch 66 is held in neutral by this means by virtue of head 16 reaching its upper position when it shifts rod 47 to a position causing the stopping of cam drum 18 all as more fully described in Patent 1,360,175. The apparatus remains in this position of neutrality until all other cycles of operation have been completed at other stations of the machine. As previously explained, the carrier 12 is then indexed by the rotation of shaft 33, and upon completion of the rotation of shaft 33, cam 54 on drum 53 actuates linkage 56 to shift rod 47 so that clutch 24 engages clutch 26 to start cam drum 18 rotating at a rapid rate. Rotation of drum 18 causes timing disc 51 to begin rotating thereby releasing link 87 causing clutch 66 to be shifted to engage gear 65 to thereby begin another cycle of operation of the attachment.

As previously stated, the principles of the invention are shown as applied to off-center tapping. Since the normal operation of the lathe includes the rotation of spindles 14, means is required to hold the spindles against rotation at the stations where the holes are drilled as well as tapped. Accordingly, the gears on shafts 40 that mesh with gears 41 on spindles 14 are omitted at the stations (preferably successive stations) where the drilling and tapping operations are to be performed. Each of the spindles 14 is provided with a brake mechanism including a band 90 (Fig. 1), the free ends of which are attached to pins 91, 92. Pin 91 is mounted in the frame of the carrier 12, while pin 92 is mounted on one arm of a bell crank 92' that is pivoted on pin 91. The free end of the bell crank 92' is adapted to cooperate with a fixed cam 93 mounted on the splash shield 94 adjacent the successive stations at which the drilling and tapping operations are adapted to be performed. Accordingly, as the work is indexed to the drilling station, the spindle is stopped by brake band 90 which remains applied until the carrier is indexed to move the work from the station at which the tapping operation is performed.

Although the various features of the attachment have been shown and described in detail to fully disclose one embodiment of this invention, it will be evident that numerous changes may be made in such details, and certain features may be used without others, without departing from the principles of the invention.

What is claimed is:

1. In a machine tool including a plurality of work supporting spindles; a carrier for said spindles; indexing mechanism for said carrier adapted to position said spindles at successive stations of said machine tool; tool-feeding means at each of said stations that may have different time cycles of operation from that of the tool-feeding means at all other stations; the combination with one of said tool-feeding means, of an attachment including rotatable and axially-movable tapping means; means within said attachment for imparting a positive lead to said tapping means in both directions and at all times during a tapping operation; means adapted to limit the movement of said tapping means toward and away from said work-supporting spindles; and timing means adapted selectively to be rotated at different speeds during a tapping operation and to cooperate with said limiting means to control the activity of said attachment.

2. In a machine tool including a plurality of work-supporting spindles; a carrier for said spindles; indexing mechanism for said carrier adapted to position said spindles at successive stations of said machine tool; tool-feeding means at each of said stations that may have different time cycles of operation from that of the tool-feeding means at all other stations; the combination with one of said tool-feeding means, of an attachment including rotatable and axially-movable tapping means; means within said attachment for simultaneously reversing the directions of axial movement and rotation of said tapping means; means adapted to limit the movement of said tapping means toward and away from said work-supporting spindles; and timing means adapted selectively to be rotated at different speeds during a tapping operation and to cooperate with said limiting means to control the activity of said attachment.

3. In a machine tool including a plurality of work-supporting spindles; a carrier for said spindles; indexing mechanism for said carrier adapted to position said spindles at successive stations of said machine tool; tool-feeding means at each of said stations that may have different time cycles of operation from that of the tool-feeding means at all other stations; the combination with one of said tool-feeding means, of an attachment including rotatable and axially-movable tapping means; a threaded member within said attachment adapted to be rotated in either direction; means for causing said threaded member to axially move and rotate said tapping means; means adapted to limit the movement of said tapping means toward and away from said work-supporting spindles; and timing means adapted selectively to be rotated at different speeds during a tapping operation and to cooperate with said limiting means to control the activity of said attachment.

4. In a machine tool including a plurality of work supporting spindles; a carrier for said spindles; indexing mechanism for said carrier adapted to position said spindles at successive stations of said machine tool; tool-feeding means at each of said stations that may have different time cycles of operation from that of the tool-feeding means at all other stations; means associated with each of said tool feeding means for preventing the indexing of said carrier until its tool has completed a cycle of operation; the combination with one of said tool-feeding means, of an attachment including rotatable and axially-movable tapping means; means within said attachment for simultaneously reversing the directions of axial movement and rotation of said tapping means; means adapted to limit the movement of said tapping means toward and away from said work-supporting spindles; and timing means adapted selectively to be rotated at different speeds during a tapping operation and to cooperate with said limiting means to control the activity of said attachment.

5. In a machine tool including a plurality of work supporting spindles; a carrier for said spindles; indexing mechanism for said carrier adapted to position said spindles at successive stations of said machine tool; tool-feeding means at each of said stations that may have different time cycles of operation from that of the tool-feeding means at all other stations; the combination with one of said tool-feeding means, of an attachment including rotatable and axially-movable tapping means; a threaded shaft within said attachment adapted to be rotated in both directions for imparting a positive lead to said tapping means at all times; means between said threaded shaft and said tapping means for rotating said tapping means at a speed commensurate with its pitch; means adapted to limit the movement of said tapping means toward and away from said work-supporting spindles; and timing means adapted selectively to be rotated at different speeds during a tapping operation and to cooperate with said limiting means to control the activity of said attachment.

6. In a machine tool including a plurality of work-supporting spindles; a carrier for said spindles; indexing mechanism for said carrier adapted to position said spindles at successive stations of said machine tool; tool-feeding means at each of said stations that may have different time cycles of operation from that of the tool-feeding means at all other stations; the combination with one of said tool-feeding means, of an attachment including rotatable and axially-movable tapping means; a relatively coarse-pitched threaded member within said attachment adapted to be rotated in either direction for axially moving and rotating said tapping means; and means associated with said threaded member for rotating said tapping means at a speed commensurate with the lead of said coarse-pitched threaded member and the pitch of said tapping means.

7. A tapping attachment for a multiple-station machine tool of the type that includes individual feeding means for tools at various stations comprising in combination, a spindle adapted to be rotated in both directions; a plurality of spaced tapping means; a spur gear connected to each of said tapping means, one of which is adapted to be driven by said spindle; a gear meshing with all of said spur gears; a housing for said tapping means adapted to be threaded onto said spindle; means for controlling the stroke of said attachment; and means adapted to cooperate with said controlling means for timing the starting of a cycle of operation of said attachment in response to the completion of all operations at all stations.

8. In a machine tool comprising in combination, a work-supporting spindle; a tool head adapted to be moved toward and away from said spindle; a cam adapted selectively to be driven at a plurality of speeds for normally controlling the movement of said tool head; timing means for selectively engaging the drives for the plurality of speeds of said cam; an attachment including means adapted to be driven at a constant speed by the means that drives said cam and to control the movement of said tool head throughout a cycle of operation independently of said cam; and means for limiting the movement of said tool head when it is under the control of said attachment including means adapted to cooperate with said timing means for controlling the starting of a cycle of operation of said attachment.

9. In a machine tool, a plurality of work-supporting members; a carrier adapted to support said members; means for indexing said carrier about a central column to position said members successively at a plurality of stations; tool heads located at a plurality of said stations and adapted to be moved toward and away from said members; timing means for separately controlling the movement of said heads; each of said tool heads being provided with means for preventing the indexing of said carrier until said head has completed a cycle of operation; tapping means including solid taps associated with one of said tool heads; means for moving said tapping means toward and away from said members and for rotating said tapping means in either direction, the construction and arrangement being such that the directions of movement and rotation of said tapping means may be simultaneously reversed; and means adapted to cooperate with said timing means for starting a cycle of operation of said tapping means subsequently to the completion of an indexing movement of said carrier.

10. In a machine tool, a work-supporting member; tapping means adapted to be moved toward and from said member; means for moving said tapping means toward and from said member and for rotating said tapping means in either direction; means for limiting the movement of said tapping means toward and from said member; a timing disc adapted selectively to be rotated at a plurality of speeds; means on said timing disc adapted to control the starting of the movement of said tapping means toward said member; and adjustable means on said timing disc to vary its rate of rotation so that the control means thereon may adjustably cooperate with said limiting means.

11. A tapping attachment for a multiple-station machine tool of the type that includes individual feeding means for tools at various stations comprising in combination, a spindle adapted to be rotated in both directions; tapping means adapted to be driven by said spindle; a housing for said tapping means adapted to be threaded onto said spindle; means for controlling the stroke of said attachment; and a timing disc including adjustable means for changing its rate of rotation, said disc being adapted to cooperate with said controlling means thereby adjustably to time the starting of a cycle of operation of said attachment.

12. In a machine tool comprising in combination, a work-supporting spindle; a tool head adapted to be moved toward and away from said spindle; a cam adapted selectively to be driven at a plurality of speeds for normally controlling the movement of said tool head; timing means for selectively engaging the drives for the plurality of speeds of said cam; a threaded shaft; a housing fixed to said tool head; an axially-movable non-rotatable nut mounted in said housing and threaded onto said shaft; tapping means mounted for rotation within said housing and operatively connected to said threaded shaft; means for driving said threaded shaft for rotating said tapping means and for moving said tool head toward and away from said member independently of said cam; and means associated with said timing means for controlling the activity of said threaded shaft.

13. An attachment for a machine tool comprising in combination, a rotatable threaded shaft; means for rotating said shaft in either direction including a shiftable clutch; a housing; a non-rotatable nut mounted in said housing and threaded onto said threaded shaft; one or more chuck spindles within said housing that are eccentrically located with respect to said threaded shaft; means on said threaded shaft for rotating said spindles; means for shifting said clutch to reverse the movement of said housing when it arrives at predetermined points in its path of travel thereby to cause it successively to move through predetermined cycles of operation; and means associated with said clutch for maintaining it in neutral for predetermined intervals of time between successive cycles of operation.

EDWARD P. BULLARD, III.
FRANK H. MUSSLER.